United States Patent
Oh et al.

(10) Patent No.: US 10,337,428 B2
(45) Date of Patent: Jul. 2, 2019

(54) APPARATUS AND METHOD FOR CONTROLLING EGR VALVE

(71) Applicant: DOOSAN INFRACORE CO., LTD., Incheon (KR)

(72) Inventors: Byoung Gul Oh, Incheon (KR); Duk Sang Kim, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 15/645,156

(22) Filed: Jul. 10, 2017

(65) Prior Publication Data

US 2017/0306870 A1 Oct. 26, 2017

Related U.S. Application Data (63) Continuation of application No. PCT/KR2016/000186, filed on Jan. 8, 2016.

(30) Foreign Application Priority Data

Jan. 8, 2015 (KR) .................. 10-2015-0002720

(51) Int. Cl.
| | | |
|---|---|---|
| F02D 21/08 | (2006.01) | |
| F02D 41/00 | (2006.01) | |
| F02M 26/46 | (2016.01) | |
| F02M 26/52 | (2016.01) | |
| F02D 41/14 | (2006.01) | |
| F02D 41/18 | (2006.01) | |

(52) U.S. Cl.
CPC ......... *F02D 41/0077* (2013.01); *F02D 21/08* (2013.01); *F02D 41/0002* (2013.01); (Continued)

(58) Field of Classification Search
CPC ............... F02D 21/08; F02D 2021/083; F02D 41/0052; F02D 41/0077; F02M 26/46; F02M 26/52
(Continued)

(56) References Cited

U.S. PATENT DOCUMENTS 5,209,214 A * 5/1993 Ikuta .................. F02D 41/1401
123/568.26
5,377,651 A * 1/1995 Sczomak ............ F02D 41/0052
123/568.28
(Continued)

FOREIGN PATENT DOCUMENTS

KR 10-1987-0010301 A 11/1987
KR 10-2011-0063169 A 6/2011
(Continued)

OTHER PUBLICATIONS

International Search Report dated Apr. 29, 2016 corresponding to International Application No. PCT/KR2016/000186.
(Continued)

*Primary Examiner* — Erick R Solis
(74) *Attorney, Agent, or Firm* — Hauptman Ham, LLP (57) ABSTRACT

An apparatus for controlling an EGR valve, includes: a measurement unit to measure at least one operation condition of an engine system; a fresh air amount setting unit to set a target amount of fresh air based on the operation condition; a fresh air amount sensor to measure a current amount of fresh air introduced through an intake line; a control calculation unit to set a signal for controlling an opening degree of the EGR valve so that the current amount of fresh air follows the target amount of fresh air; and an identifier to simulate an input and an output of the engine system, and output engine system input-output sensitivity which is a ratio of a change rate of the current amount of fresh air to a change rate of the opening degree of the EGR valve.

14 Claims, 9 Drawing Sheets

(52) U.S. Cl.
CPC ..... *F02D 41/0052* (2013.01); *F02D 41/1402* (2013.01); *F02D 41/1405* (2013.01); *F02D 41/18* (2013.01); *F02M 26/46* (2016.02); *F02M 26/52* (2016.02); *F02D 2021/083* (2013.01); *F02D 2041/1409* (2013.01); *F02D 2041/1422* (2013.01); *F02D 2041/1423* (2013.01); *F02D 2041/1431* (2013.01); *F02D 2041/1437* (2013.01); *Y02T 10/42* (2013.01); *Y02T 10/47* (2013.01)

(58) Field of Classification Search
USPC ..................................................... 123/568.21
See application file for complete search history.

(56) References Cited

U.S. PATENT DOCUMENTS

| | | | | |
|---|---|---|---|---|
| 5,791,319 | A | * | 8/1998 | Friedrich ............ F02D 41/0072 123/568.18 |
| 6,016,788 | A | * | 1/2000 | Kibe ................... F02D 41/0052 123/357 |
| 2012/0265425 | A1 | | 10/2012 | Maruyama et al. |
| 2014/0109868 | A1 | * | 4/2014 | Zhu ..................... F02D 41/0072 123/349 |
| 2015/0219029 | A1 | * | 8/2015 | Nakashima ......... F02D 41/0072 123/703 |

FOREIGN PATENT DOCUMENTS

| | | |
|---|---|---|
| KR | 10-2011-0138919 A | 12/2011 |
| KR | 10-2013-0043288 A | 4/2013 |
| WO | 2010/022833 A1 | 3/2010 |
| WO | 2014-104628 A1 | 7/2014 |

OTHER PUBLICATIONS

European Search Report dated Nov. 14, 2018, issued in corresponding European Patent Application No. 16735202.0.

* cited by examiner

APPARATUS AND METHOD FOR CONTROLLING EGR VALVE

CROSS-REFERENCE TO RELATED APPLICATIONS

The present application is a continuation of International Application No. PCT/KR2016/000186, filed Jan. 8, 2016, which is based upon and claims the benefit of priority from Korean Patent Application No. 10-2015-0002720, filed on Jan. 8, 2015. The disclosures of the above-listed applications are hereby incorporated by reference herein in their entirety.

TECHNICAL FIELD

The present disclosure relates to a control apparatus and a control method, and more particularly, to an apparatus and a method for controlling an exhaust gas recirculation (EGR) valve.

BACKGROUND ART

The statements in this section merely provide background information related to the present disclosure and do not constitute prior art.

Exhaust gas discharged from an engine contains a large amount of hazardous substances such as CO, HC, and NOx. Focus on the serious problem of air pollution caused by the exhaust gas discharged from the engine has become urgent, and thus exhaust gas emission regulations have become stricter in many countries. To meet the exhaust gas emission regulations in each country, many methods and apparatuses for purifying exhaust gas have been proposed, and particularly, many efforts have been made in order to remove NOx which is known as a substance that greatly affects the air pollution among the substances contained in the exhaust gas discharged from a vehicle. As one method, recently, exhaust gas recirculation (EGR) is widely used. The EGR recirculates a part of the exhaust gas into a combustion chamber of the engine and lowers a combustion temperature of the engine, thereby reducing the occurrence of NOx. An EGR apparatus includes an EGR line that extends from an exhaust line of the engine to an intake line of the engine, and an EGR valve is provided in the EGR line in order to adjust the amount of exhaust gas recirculated and introduced into the intake line in accordance with an operation condition. The EGR valve adjusts the amount of exhaust gas recirculated into the intake line by adjusting an opening degree of the EGR line.

In general, as a control algorithm of the EGR valve, PI control or PID control is used to adjust the opening degree of the EGR line by controlling an operation of the EGR valve by combining proportional control, integral control, and differential control. These kinds of control may be expressed as a control function, and the control function includes control parameters such as a proportional gain Kp, an integral gain Ki, and a differential gain Kd. Optimized gains, which are adjusted in accordance with various operation conditions, are required to improve responsiveness of the engine and ensure stable behavior of the engine. However, in the related art, there is a need for engineers trained to tune the EGR valve and control tests need to be performed under many operation conditions, and as a result, there is a problem in that efficiency deteriorates. In addition, the gains are generally used only for the designated engine, and as a result, there is a problem in that a lot of effort needs to be made to set a new gain and adapt the new gain to an operation condition even though the engine is slightly changed.

SUMMARY

According to some embodiments of the present disclosure, an apparatus for controlling an EGR valve includes a measurement unit, a fresh air amount setting unit, a fresh air amount sensor, a control calculation unit and an identifier. The measurement unit, implemented by one or more processor, is configured to measure at least one operation condition of an engine system. The fresh air amount setting unit, implemented by one or more processor, is configured to set a target amount of fresh air based on the operation condition; a fresh air amount sensor which measures a current amount of fresh air introduced through an intake line. The control calculation unit, implemented by one or more processor, is configured to output a signal for controlling an opening degree of the EGR valve so that the current amount of fresh air follows the target amount of fresh air. And the identifier, implemented by one or more processor, is configured to simulate an input and an output of the engine system, and outputs engine system input-output sensitivity which is a ratio of a change rate of the current amount of fresh air to a change rate of the opening degree of the EGR valve, in which at least one gain, which is used for the calculation of the control calculation unit, is divided by the engine system input-output sensitivity.

In this case, the operation condition may include at least one of a rotational speed of an engine and a fuel injection amount.

Further, the identifier may be a neural network model.

Further, the target amount of fresh air may be obtained by inputting the operation condition to a lookup table.

Further, a preset constant may be used as the gain of the control calculation unit.

According to some embodiments of the present disclosure, a method of controlling an EGR valve, the method including: measuring an operation condition of an engine system and a current amount of fresh air; setting a target amount of fresh air based on the operation condition; calculating, based on the operation condition, engine system input-output sensitivity which is a ratio of a change rate of the current amount of fresh air to a change rate of an opening degree of the EGR valve; calculating a control error by comparing the target amount of fresh air with the current amount of fresh air; dividing at least one gain, which is used for the calculation of the control calculation unit, by the engine system input-output sensitivity; determining the opening degree of the EGR valve so that the current amount of fresh air follows the target amount of fresh air; and controlling the EGR valve.

In this case, the operation condition may include a rotational speed of an engine and a fuel injection amount.

Further, the setting of the target amount of fresh air may include obtaining the target amount of fresh air by inputting the operation condition to a lookup table.

DESCRIPTION OF DRAWINGS

The present disclosure provides an apparatus and a method for controlling an EGR valve, which are capable of being efficiently set to enable optimized control of the EGR valve even under various operation conditions.

Hereinafter, exemplary embodiments of the present disclosure will be described in detail with reference to the accompanying drawings. First, in denoting reference numerals to constituent elements of the respective drawings, it should be noted that the same constituent elements will be designated by the same reference numerals, if possible, even though the constituent elements are illustrated in different drawings. Further, in the following description of the present disclosure, a detailed description of publicly known configurations or functions incorporated herein will be omitted when it is determined that the detailed description may make the subject matter of the present disclosure unclear.

Figure 1:
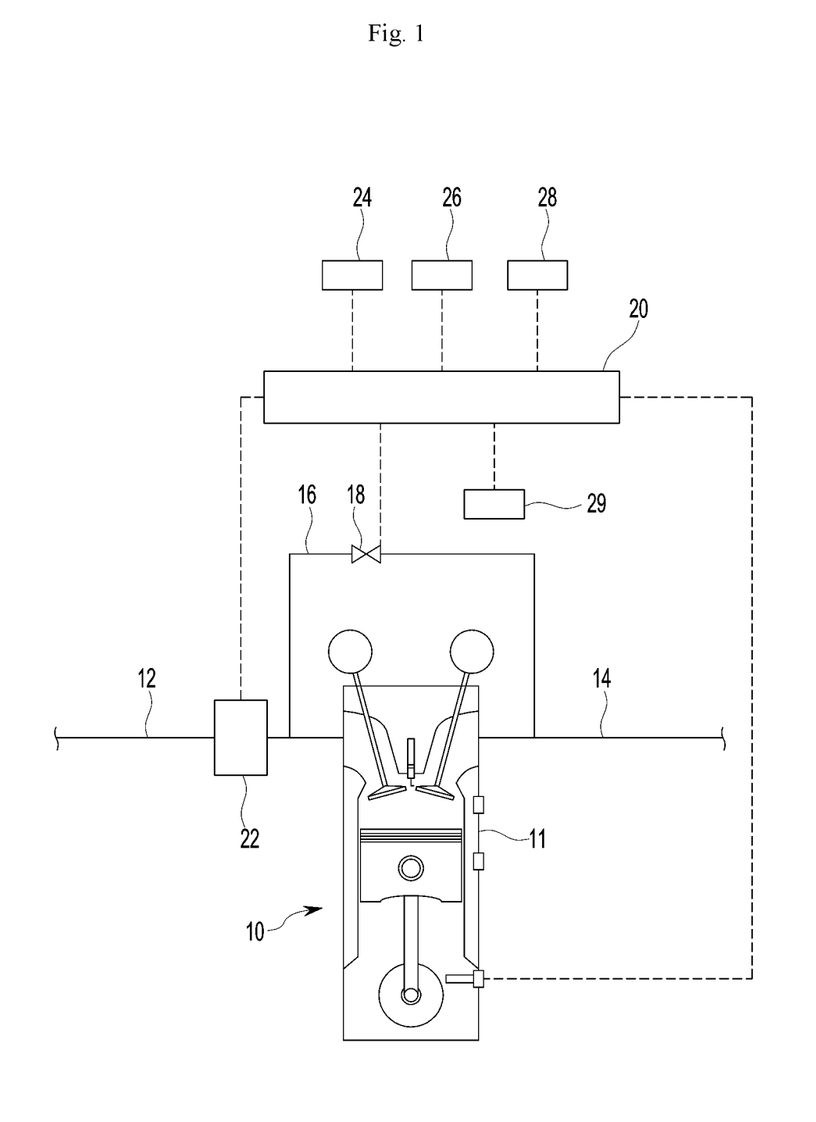
FIG. 1 is a configuration view of an engine system to which an apparatus for controlling an EGR valve according to an exemplary embodiment of the present disclosure is applied.
Figure 2:
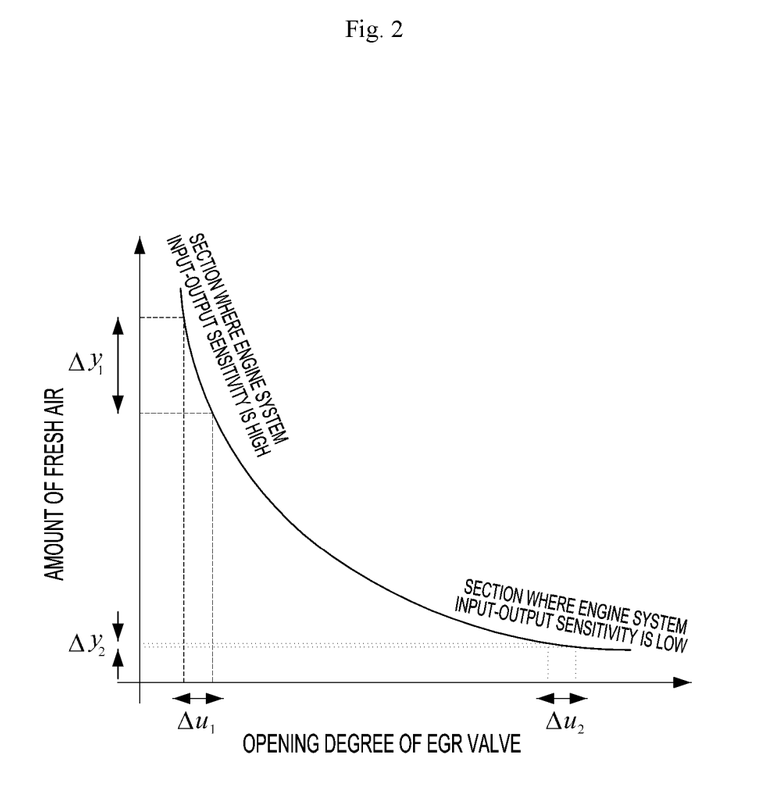
FIG. 2 is a graph illustrating an example of a relationship between an amount of fresh air introduced into an engine and an opening degree of an EGR valve of the engine system to which the apparatus for controlling the EGR valve according to the exemplary embodiment of the present disclosure is applied.
Figure 3:
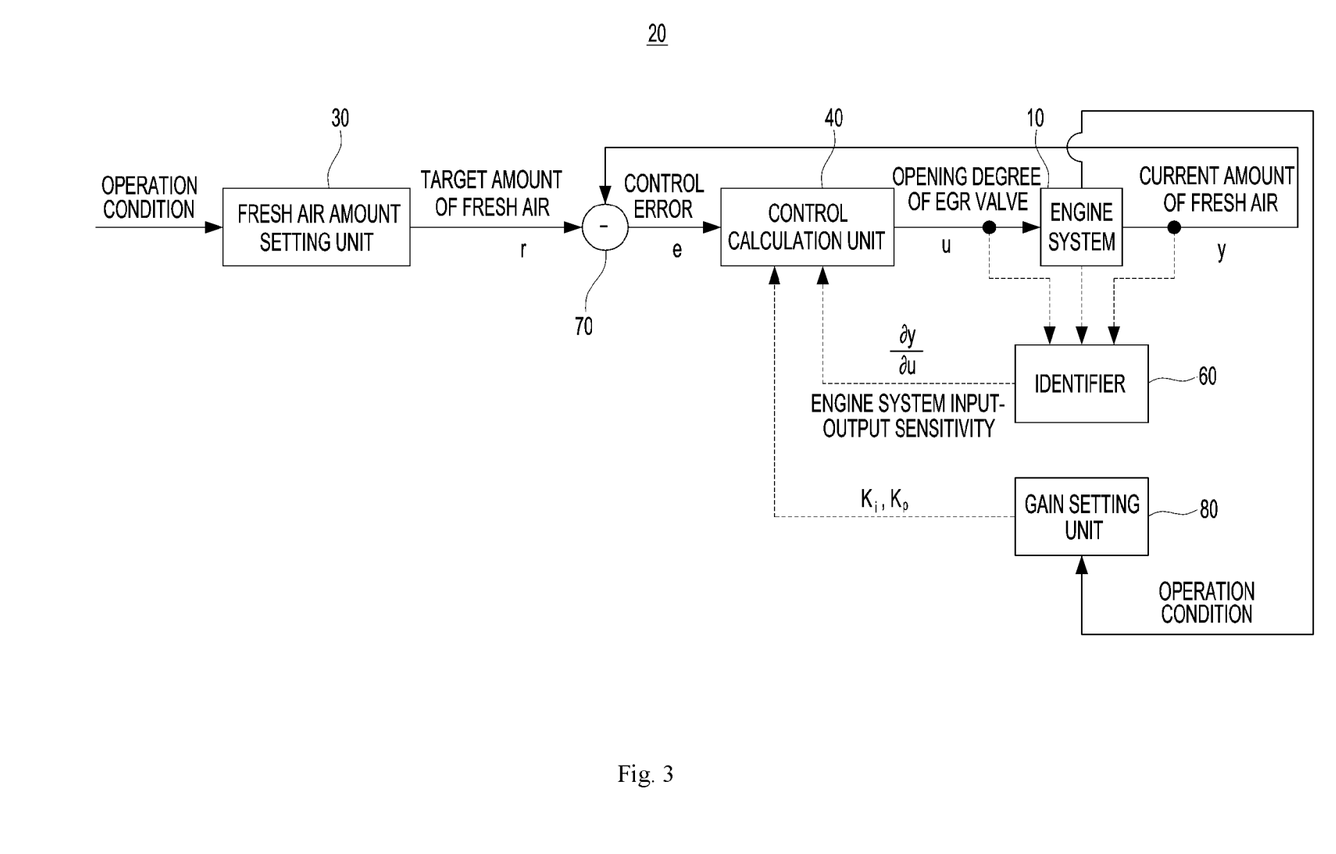
FIG. 3 is a configuration view of an EGR valve opening degree control unit according to the exemplary embodiment of the present disclosure.
Figure 4:
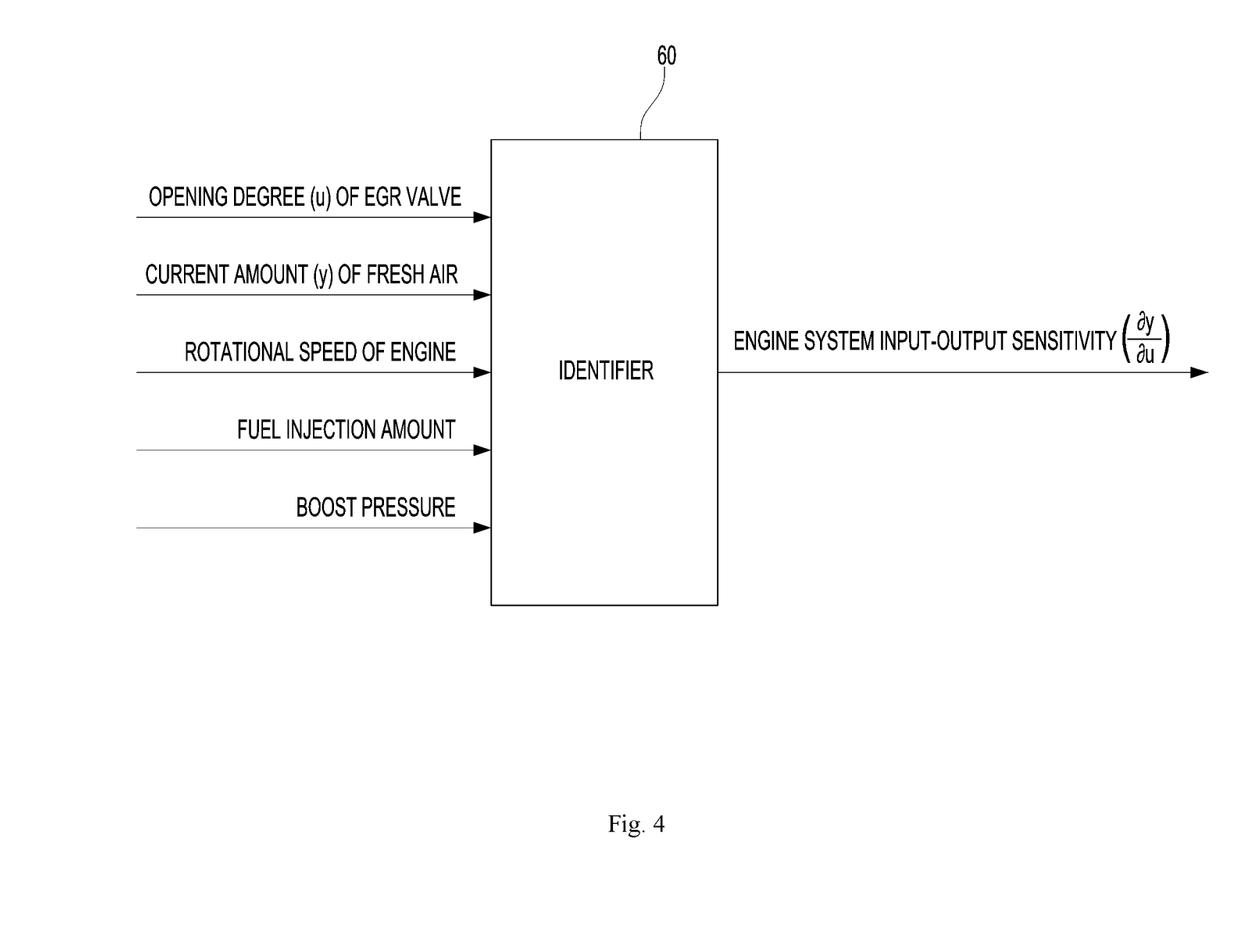
FIG. 4 is a view illustrating an operating state of an identifier of the apparatus for controlling the EGR valve according to the exemplary embodiment of the present disclosure.

FIG. 1 is a configuration view of an engine system to which an apparatus for controlling an EGR valve according to an exemplary embodiment of the present disclosure is applied, and FIG. 2 is a graph illustrating an example of a relationship between an amount of fresh air introduced into an engine and an opening degree of an EGR valve of the engine system to which the apparatus for controlling the EGR valve according to the exemplary embodiment of the present disclosure is applied. FIG. 3 is a configuration view of an EGR valve opening degree control unit according to the exemplary embodiment of the present disclosure, and FIG. 4 is a view illustrating an operating state of an identifier of the apparatus for controlling the EGR valve according to the exemplary embodiment of the present disclosure.

Referring to FIG. 1, an apparatus for controlling an EGR valve according to the exemplary embodiment of the present disclosure may be applied to an engine system provided with an EGR system. Referring to FIG. 1, the engine system 10 may include an engine block 11 which includes a combustion chamber, an intake line 12 which is connected to an intake port of the engine block 11 so that fresh air (ambient air) is introduced into the intake line 12, an exhaust line 14 which is connected to an exhaust port of the engine block 11 so that exhaust gas is introduced into the exhaust line 14, an EGR line 16 which diverges from the exhaust line 14 and is connected to the intake line 12, and an EGR valve 18 which is positioned in the EGR line 16 and adjusts an opening degree of the EGR line 16.

The apparatus for controlling the EGR valve according to the exemplary embodiment of the present disclosure may include a measurement unit which measures at least one operation condition of the engine system 10, a fresh air amount sensor 22 which measures a current amount y of fresh air introduced through the intake line 12, an EGR valve sensor 29 which detects an opening degree of the EGR valve, and an EGR valve opening degree control unit 20 which sets a target amount r of fresh air based on an operation condition and controls an opening degree u of the EGR valve so that the current amount y of fresh air follows the target amount r of fresh air. The value measured by the EGR valve sensor 29 may be transmitted to the EGR valve opening degree control unit 20.

As illustrated in FIG. 2, in a general engine system, the opening degree u of the EGR valve and the amount y of fresh air have a nonlinear relationship, and there are sections where engine system input-output sensitivity $\partial y/\partial u$ is high and low, that is, there are sections where a change in amount of fresh air is relatively large and small with respect to the same change in opening degree of the EGR valve. The case where the EGR valve is controlled without considering the aforementioned properties adversely affects performance of the system such as stability and responsiveness of the system, and therefore, gains, which are used for controlling and calculating operations of the EGR valve opening degree control unit 20, need to be corrected corresponding to a driving state of the engine system. In other words, under an operation condition in which the engine system input-output sensitivity $\partial y/\partial u$ is high, it is necessary to decrease the gain of the EGR valve opening degree control unit 20 or relatively decrease a variation in gain, so that a stable output may be produced without oscillation, and under an operation condition in which the engine system input-output sensitivity $\partial y/\partial u$ is low, it is necessary to increase the gain of the EGR valve opening degree control unit 20 or relatively increase a variation in gain, so that a reaction rate is not decreased. In the present disclosure, an identifier 60 is adopted to control the opening degree of the EGR valve under various operation conditions. The identifier 60 will be described in detail below.

The measurement unit measures at least one of various operation conditions of the engine system 10 and transmits the measured operation condition to the EGR valve opening degree control unit 20. The operation conditions of the engine system 10 may include various information related to driving of the engine, such as a rotational speed of the engine, a fuel injection amount, boost pressure, and pressure and temperature of intake and exhaust manifolds. The measurement unit may include an engine rotational speed sensor 24, a fuel injection amount sensor 26, a boost pressure sensor 28, a temperature sensor, and the like in order to measure the information. Meanwhile, various operation condition information, such as the rotational speed of the engine, the fuel injection amount, the boost pressure, and the pressure and the temperature of the intake and exhaust manifolds, may be obtained by the sensors that directly measure the corresponding values, but the operation condition information may also be obtained by being calculated from values measured by sensors for measuring other operation conditions in order to reduce the number of components and simplify the configuration.

The fresh air amount sensor 22 measures the current amount y of fresh air introduced into the combustion chamber of the engine 11 through the intake line 12. The fresh air amount sensor 22 may be disposed at an upstream side of a point of the intake line 12 to which the EGR line 16 is connected. The fresh air amount sensor may be a mass air flow (MAF) sensor. The current amount y of fresh air measured by the fresh air amount sensor 22 may be outputted to a subtractor (70 in FIG. 3).

Referring to FIG. 3, Other components of the EGR valve opening degree control unit 20, such as the fresh air amount setting unit 30, the control calculation unit 40, the identifier 60, the subtractor 70, and the gain setting unit 80 comprise one or more processors and/or application-specific integrated circuits (ASICs) specified for respectively implementing corresponding operations and functions described herein. The EGR valve opening degree control unit 20 may set the target amount r of fresh air corresponding to the operation condition by using the fresh air amount setting unit 30. To receive the operation condition, the EGR valve opening degree control unit 20 may be connected to various types of sensors including the engine rotational speed sensor 24, the fuel injection amount sensor 26, and the boost pressure sensor 28. A lookup table may be used as a method of setting the target amount r of fresh air based on the current operation condition. When the operation condition of the engine system 10 is transmitted from the measurement unit, the fresh air amount setting unit 30 sets the target amount r of fresh air by inputting the operation condition into the lookup table, and the set target amount r of fresh air is outputted to the subtractor 70. Meanwhile, as another method of setting the target amount r of fresh air, a preset mathematical model may be used instead of the lookup table.

The subtractor 70 compares the inputted target amount r of fresh air with the current amount y of fresh air, and outputs a control error e. The control error e is outputted to the control calculation unit 40.

The identifier 60 simulates behavior of the engine and outputs the engine system input-output sensitivity $\partial y/\partial u$ to the control calculation unit 40. The engine system input-output sensitivity $\partial y/\partial u$ is a ratio of a change rate of the current amount y of fresh air to a change rate of the opening degree u of the EGR valve. Referring to FIG. 4, operation conditions, such as the opening degree u of the EGR valve, the current amount y of fresh air, and the rotational speed of the engine, the fuel injection amount, and the boost pressure of the control calculation unit 40, which affect a change in amount of fresh air are inputted to the identifier 60, and based on the information, the identifier 60 determines and outputs the engine system input-output sensitivity $\partial y/\partial u$.

Figure 5:
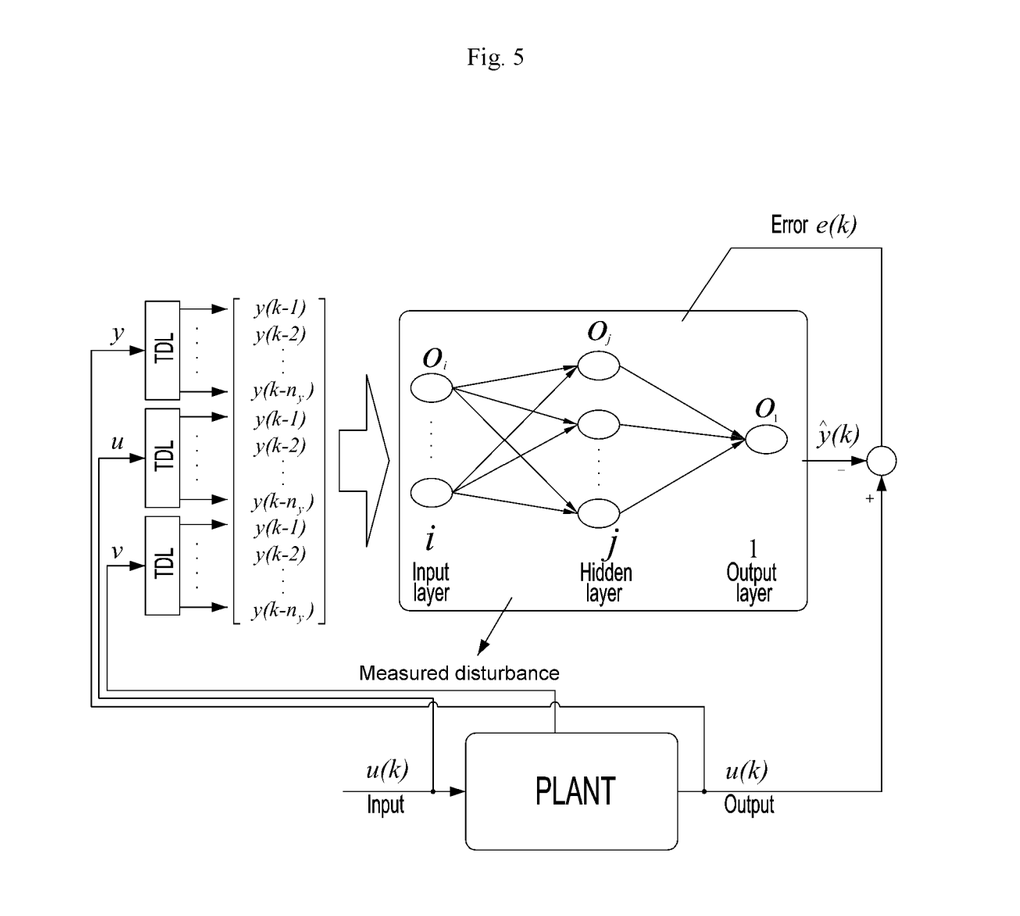
FIG. 5 is a view illustrating an exemplary embodiment of a neural network model of the identifier of the apparatus for controlling the EGR valve according to the exemplary embodiment of the present disclosure.

The identifier 60 may simulate the behavior of the engine system 10 by using various methods, and as an example, a neural network model may be used. FIG. 5 is a view illustrating an exemplary embodiment of a neural network model of the identifier of the apparatus for controlling the EGR valve according to the exemplary embodiment of the present disclosure. Referring to FIG. 5, the neural network model may use a multilayer perceptron algorithm including an input layer neuron, a hidden layer neuron, and an output layer neuron. The neural network model, which completes learning, may simulate the output of the engine system 10 as it is, and this means that the engine system 10 is mathematically modeled.

The learning of the neural network model is a process of comparing an engine system output y predicted by the neural network model with an actual engine system output y, and updating parameters of the neural network model so that the actual engine system output y becomes equal to the engine system output y predicted by the identifier 60. After the updating is completed, the neural network model shows the same behavior as the actual engine system 10. The learning of the neural network model may use a method widely known in the field of a back propagation learning algorithm.

A learning pattern of the neural network model includes an input pattern and a target pattern. The target pattern means a value that needs to be outputted based on a particular input value when the particular input value is applied to the neural network model. When signals are inputted to units of an input layer i, the signals are converted by the units and transmitted to a hidden layer j, and an output layer k finally outputs the signals. Connection strength between weights $W_{ji}$ and $W_{1j}$ is adjusted by decreasing a difference between the output value and an expected value while comparing the output value with the expected value, and then the process is performed again from the beginning. When this process is repeated, the error is decreased to an appropriate level, and the neural network model may simulate input and output behavior of the engine system 10.

Meanwhile, input variables, which are inputted to the input layer i of the neural network model, may be inputted to the input layer i through a tapped delay line (TDL). When the input variables are inputted to the input layer i through the tapped delay line TDL, the input value, which is to be inputted to the input layer i, has a vector form in which the current input variable value and the previous n input variable values are sequentially accumulated. When the input variables, which are inputted to the input layer i, are inputted through the tapped delay line TDL, the past values, as well as the current values, may be applied to the neural network model, and as a result, learning accuracy of the neural network model may be improved.

Figure 6:
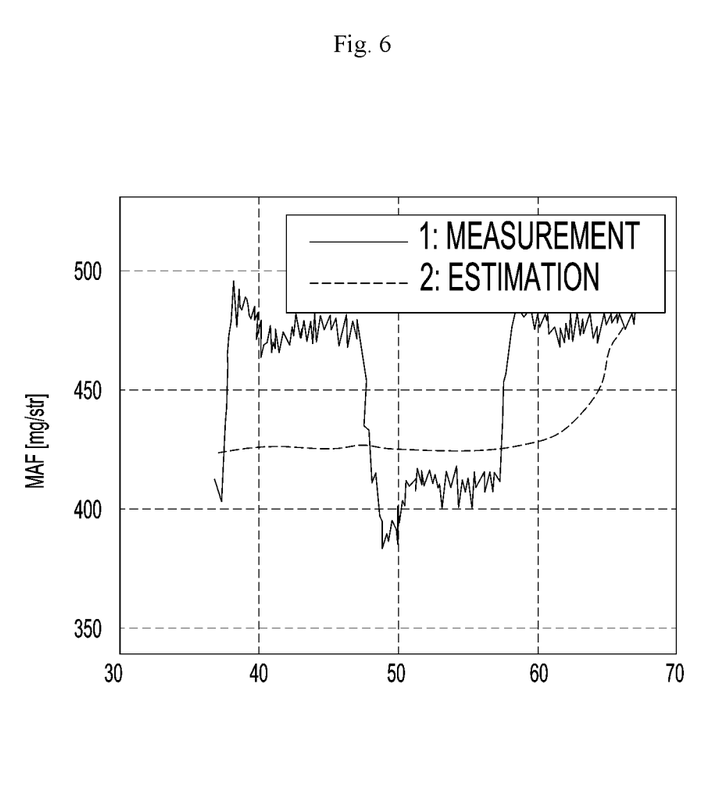
FIGS. 6 to 8 are views illustrating a process in which the identifier of the apparatus for controlling the EGR valve according to the exemplary embodiment of the present disclosure simulates behavior of the engine system through learning.
Figure 7:
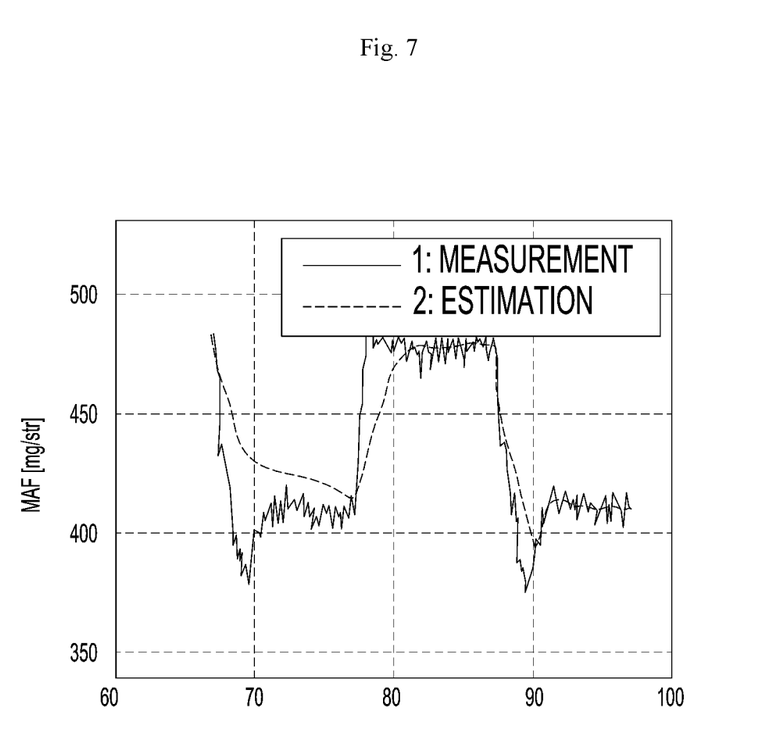
Figure 8:
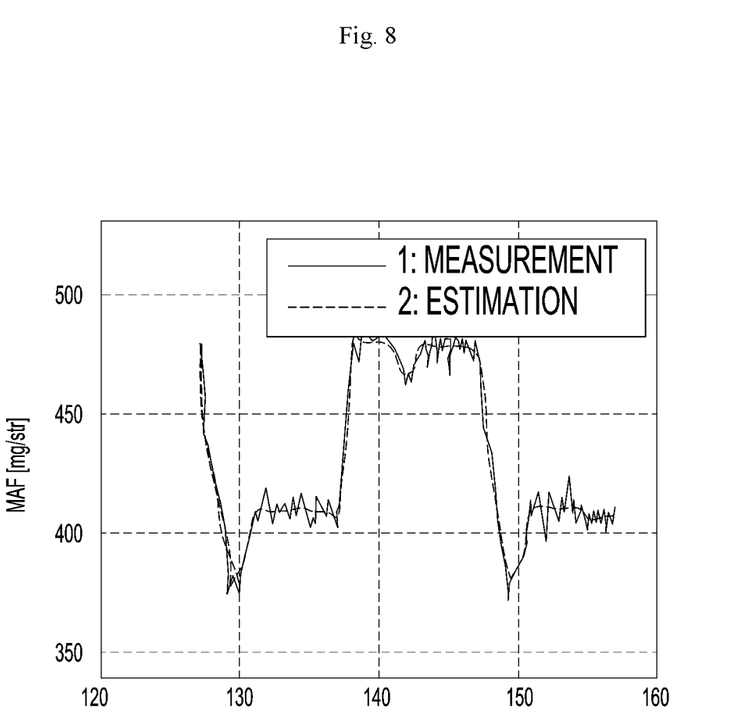

As illustrated in FIGS. 6 to 8, the neural network model may simulate the input and output behavior similar to the actual engine system 10 while iteratively performing the learning. Therefore, it is necessary to perform iterative learning in order to improve precision in the simulation of the neural network model. The neural network model may perform the learning by using data corresponding to various operation conditions in order to have a simulation ability with high accuracy with respect to various operation conditions that may occur in the engine system 10.

Meanwhile, the present exemplary embodiment describes that the identifier 60 is implemented by the neural network model, but the identifier 60 is not limited thereto, and the identifier 60 may be a black box model using various publicly known methods that may simulate the behavior of the engine system 10.

The control calculation unit 40 compares the target amount r of fresh air with the current amount y of fresh air, and outputs a control signal for controlling the opening degree of the EGR valve 18 so that the current amount y of fresh air follows the target amount r of fresh air. The control calculation unit 40 may be a proportional-integral (PI) controller, but the control calculation unit 40 is not limited thereto, and the control calculation unit 40 may be various types of currently known controllers such as a proportional-integral-derivative (PID) controller. In the present exemplary embodiment, the description will be made assuming that the control calculation unit 40 is the PI controller.

Referring to FIG. 3, the control error e, which is a difference between the target amount r of fresh air and the current amount y of fresh air, is inputted to the control calculation unit 40, and the control calculation unit 40 receives the control error e and outputs the opening degree u of the EGR valve. A general PI controller, which does not consider the identifier 60, calculates a proportional term based on the control error e and a proportional gain kp, calculates an integral term based on the control error e and an integral gain ki, and outputs the opening degree u of the EGR valve which is an output value, and the proportional gain kp, the control error e, the integral gain ki, and the opening degree u have the following relationship.

$$u = k_p \cdot e + k_i \cdot \int e \, dt$$

The control calculation unit 40 may express the following expression in consideration of the engine system input-output sensitivity ∂y/∂u inputted to the control calculation unit 40 from the identifier 60 in the above expression.

$$u = \frac{k_p \cdot e + k_i \cdot \int e \, dt}{\frac{\partial y}{\partial u}}$$

As described above, at least one gain, which is utilized for the calculation of the control calculation unit 40, is divided by the engine system input-output sensitivity ∂y/∂u outputted from the identifier 60, thereby obtaining an effect in that the gain of the control calculation unit 40 is automatically corrected in accordance with a current driving state of the engine system 10. In the present exemplary embodiment, an example in which both of the proportional gain and the integral gain are divided by the engine system input-output sensitivity ∂y/∂u is described. Therefore, in a case in which sensitivity is high in the current driving state, the gain of the control calculation unit 40 is decreased or a variation in gain is decreased. For this reason, a variation in control signal outputted to the EGR valve 18 is decreased, and as a result, stability of the engine in the corresponding section is improved. In a case in which sensitivity is low under the current operation condition, the gain of the control calculation unit 40 is increased or a variation in gain is increased, and a variation in control signal outputted from the control calculation unit 40 is increased, and as a result, responsiveness of the engine in the corresponding section may be improved.

Here, the proportional gain kp and the integral gain ki may be set through a gain setting unit 80, and the proportional gain kp and the integral gain ki may be changed to correspond to various operation conditions with reference to the preset lookup table. According to the present exemplary embodiment that utilizes the engine system input-output sensitivity ∂y/∂u, the lookup table, which is simpler than that in the related art, may be used, such that the lookup table may be simply established. According to another exemplary embodiment of the present disclosure, a configuration in which the gain setting unit 80 is omitted may be embodied, and in a case in which the gain setting unit 80 is omitted, the gains are set to preset constants. In this case, an effort for establishing the lookup table for presetting the gains may be omitted.

In a case in which the PID controller is used as the control calculation unit 40 as described above, the control calculation unit 40 calculates operands such as a proportional term, an integral term, and a derivative term, and divides at least one of the proportional gain kp, the integral gain ki, and the differential gain kd, which are used for the operands, by the engine system input-output sensitivity ∂y/∂u. As necessary, the control calculation unit 40 and the identifier 60 may be the same constituent element as the fresh air amount setting unit 30, the control calculation unit 40 and the identifier 60 may be formed as a part of the fresh air amount setting unit 30, or the control calculation unit 40 and the identifier 60 may be formed as independent constituent elements separately from the fresh air amount setting unit 30. For example, in a case in which the apparatus for controlling the EGR valve according to the present disclosure is applied to a vehicle, the fresh air amount setting unit 30, the control calculation unit 40, and the identifier 60 may be parts of an electronic control unit (ECU) of the vehicle.

Next, an exemplary embodiment of a method of controlling the EGR valve by using the apparatus for controlling the EGR valve will be described.

Figure 9:
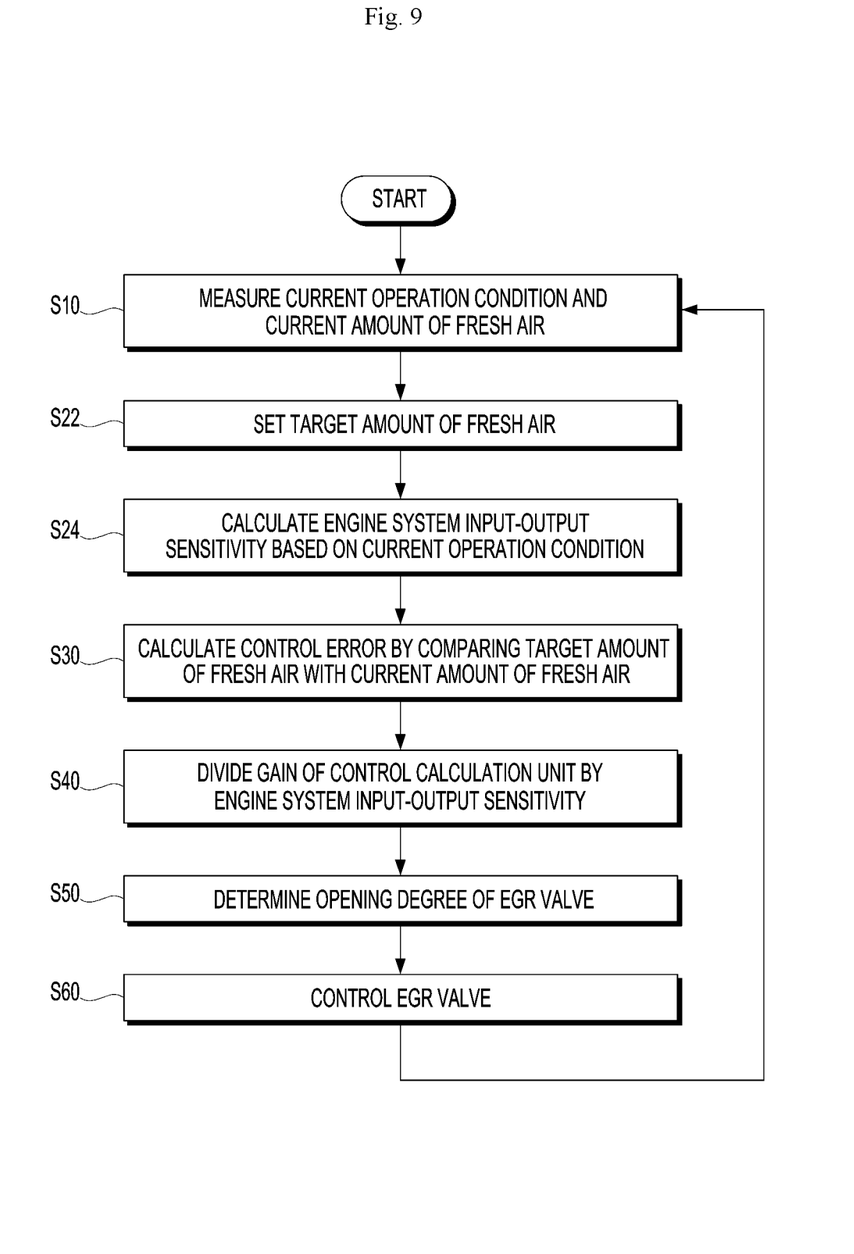
FIG. 9 is a flowchart of a method of controlling an EGR valve according to another exemplary embodiment of the present disclosure.

FIG. 9 is a flowchart of a method of controlling an EGR valve according to another exemplary embodiment of the present disclosure. Referring to FIG. 9, the method of controlling the EGR valve according to the exemplary embodiment of the present disclosure may include measuring an operation condition of the engine system 10 and the current amount y of fresh air (S10), setting the target amount r of fresh air based on the operation condition (S22), calculating engine system input-output sensitivity ∂y/∂u based on the operation condition (S24), calculating the control error e by comparing the target amount of fresh air with the current amount of fresh air (S30), dividing a gain of the control calculation unit 40 by the engine system input-output sensitivity ∂y/∂u (S40), determining the opening degree u of the EGR valve so that the current amount y of fresh air follows the target amount r of fresh air (S50), and controlling the EGR valve 18 (S60).

In the measuring of the operation condition and the current amount y of fresh air (S10), operation condition information of the engine system 10 is measured by the measurement unit, and the current amount y of fresh air is measured by the fresh air amount sensor 22. The measurement unit may include the engine rotational speed sensor 24 which measures the rotational speed of the engine, the fuel injection amount sensor 26 which measures the fuel injection amount, and the boost pressure sensor 28 which measures the boost pressure, and the measurement unit may include publicly known sensors for measuring various operation conditions of the engine. The measured operation conditions are outputted to the fresh air amount setting unit 30 and the identifier 60, and the current amount y of fresh air is outputted to the subtractor 70.

In the setting of the target amount r of fresh air (S22), the fresh air amount setting unit 30 may set the target amount r of fresh air by inputting the operation condition into the lookup table. Alternatively, the fresh air amount setting unit 30 may set the target amount r of fresh air by inputting the operation condition to a preset mathematical model. The set target amount r of fresh air is outputted to the subtractor 70.

In the calculating of the engine system input-output sensitivity ∂y/∂u (S24), the identifier 60 calculates the engine system input-output sensitivity ∂y/∂u by receiving the opening degree u of the EGR valve, the current amount y of fresh air, and other operation conditions, and outputs the engine system input-output sensitivity ∂y/∂u to the control calculation unit 40.

In the calculating of the control error e by comparing the target amount r of fresh air with the current amount y of fresh air (S30), the subtractor 70 calculates the control error e by comparing the inputted target amount r of fresh air with the current amount y of fresh air. The calculated control error e is outputted to the control calculation unit 40.

In the dividing of at least one gain, which is used for the calculation of the control calculation unit 40, by the engine system input-output sensitivity ∂y/∂u (S40), at least one of the gain values of the control calculation unit 40 is divided by the engine system input-output sensitivity ∂y/∂u. Therefore, the gain of the control calculation unit 40 is automatically corrected in accordance with the current driving state of the engine system 10.

In the determining of the opening degree u of the EGR valve (S50), the control calculation unit 40 calculates the opening degree u of the EGR valve by receiving the control error e, and outputs the opening degree u of the EGR valve. Thereafter, the EGR valve 18 is controlled by a control signal related to the opening degree u of the EGR valve, which is outputted from the control calculation unit 40 (S60).

Thereafter, the process returns back to the measuring of the current operation condition of the engine system 10 and the current amount y of fresh air (S10), and the above processes are iteratively performed, such that feedback control is performed so that the current amount y of fresh air follows the target amount r of fresh air.

According to the exemplary embodiment of the present disclosure, engine system input-output sensitivity is outputted by an identifier for simulating behavior of the engine system, and a gain of the EGR valve controller is automatically corrected based on the sensitivity, such that the EGR system may be simply constructed at low costs.

The above description is simply given for illustratively describing the technical spirit of the present disclosure, and those skilled in the art to which the present disclosure pertains will appreciate that various modifications, changes and substitutions are possible without departing from the spirit and scope of the claimed invention. Specific terms used in this disclosure and drawings are used for illustrative purposes and not to be considered as limitations of the present disclosure. Therefore, the exemplary embodiments of the present disclosure are provided for illustrative purposes only but not intended to limit the technical concept of the present disclosure, and the scope of the technical spirit of the claimed invention is not limited thereto. The protective scope of the claimed invention should be construed based on the following claims, and all the technical spirit in the equivalent scope thereto should be construed as falling within the scope of the present disclosure.

What is claimed is:

1. An apparatus for controlling an EGR valve, the apparatus comprising:
   a measurement unit configured to measure at least one operation condition of an engine system;
   a fresh air amount setting unit configured to set a target amount of fresh air based on the operation condition;
   a fresh air amount sensor configured to measure a current amount of fresh air introduced through an intake line;
   a control calculation unit configured to set a signal for controlling an opening degree of the EGR valve so that the current amount of fresh air follows the target amount of fresh air;
   an identifier configured to
      simulate an input and an output of the engine system by predicting the output of the engine system, comparing the predicted output with actual output of the engine system, and updating parameters of the identifier so that the output of engine system becomes equal to the predicted output of the engine system, and
      output engine system input-output sensitivity which is a ratio of a change rate of the current amount of fresh air to a change rate of the opening degree of the EGR valve; and
   a gain setting unit configured to set at least one gain, which is used for the calculation of the control calculation unit, according to an operation condition of the engine system,
   wherein the gain is divided by the engine system input-output sensitivity, and
   the control calculation unit corrects the gain in accordance with the operation condition of an engine system, by dividing the gain by the engine system input-output sensitivity.

2. The apparatus of claim 1, wherein the operation condition includes at least one of a rotational speed of an engine, a fuel injection amount, and the boost pressure of the control calculation unit 40, which affect a change in amount of fresh air are inputted the identifier.

3. The apparatus of claim 1, wherein the identifier is a neural network model, and the parameters are included in the neural network model.

4. The apparatus of claim 3, wherein the neural network model includes an input layer neuron, a hidden layer neuron, and an output layer neuron, and the operation condition is inputted to the input layer neuron through a tapped delay line (TDL).

5. The apparatus of claim 1, wherein the target amount of fresh air is obtained by inputting the operation condition to a lookup table.

6. The apparatus of claim 1, wherein at least one gain, which is divided by the engine system input-output sensitivity, is a preset constant.

7. The apparatus of claim 1, further comprising:
   a substractor configured to
      calculate a control error by comparing the target amount of fresh air with the current amount of fresh air, and
      output the control error to the control calculation unit.

8. The apparatus of claim 1, wherein the gain includes a proportional gain and an integral gain.

9. A method of controlling an EGR valve, the method comprising:
   measuring at least one operation condition of an engine system and a current amount of fresh air;
   setting a target amount of fresh air based on the operation condition;
   calculating, based on the operation condition, engine system input-output sensitivity which is a ratio of a change rate of the current amount of fresh air to a change rate of an opening degree of the EGR valve;
   calculating a control error by comparing the target amount of fresh air with the current amount of fresh air;
   setting at least one gain, which is used for the calculation of the control calculation unit, according to an operation condition of the engine system;
   dividing the gain by the engine system input-output sensitivity;
   correcting the gain in accordance with the operation condition of an engine system, by dividing the gain by the engine system input-output sensitivity;
   determining the opening degree of the EGR valve so that the current amount of fresh air follows the target amount of fresh air; and
   controlling the EGR valve,
   wherein the calculating of the engine system input-output sensitivity comprises
   simulating an input and an output of the engine system by predicting the output of the engine system, comparing the predicted output with actual output of the engine system, and updating parameters of the identifier so that the output of engine system becomes equal to the predicted output of the engine system.

10. The method of claim 9, wherein the operation condition includes at least one of a rotational speed of an engine, a fuel injection amount, and the boost pressure.

11. The method of claim 9, wherein the setting of the target amount of fresh air includes obtaining the target amount of fresh air by inputting the operation condition to a lookup table.

12. The method of claim 9, wherein the engine system input-output sensitivity is calculated by an identifier that uses a neural network model.

13. The method of claim 12, wherein the neural network model includes an input layer neuron, a hidden layer neuron, and an output layer neuron, and the operation condition is inputted to the input layer neuron through a tapped delay line (TDL).

14. The method of claim 9, wherein the gain, which is divided by the engine system input-output sensitivity, is a preset constant.

* * * * *